(12) United States Patent
Marcus et al.

(10) Patent No.: US 11,650,999 B2
(45) Date of Patent: May 16, 2023

(54) DATABASE SEARCH ENHANCEMENT AND INTERACTIVE USER INTERFACE THEREFOR

(71) Applicant: Talenya Ltd., Rosh HaAyin (IL)

(72) Inventors: David J. Marcus, Potomac, MD (US); Doron Segal, Hoshaya (IL)

(73) Assignee: Talenya Ltd., Rosh HaAyin (IL)

( * ) Notice: Subject to any disclaimer, the term of this patent is extended or adjusted under 35 U.S.C. 154(b) by 0 days.

(21) Appl. No.: 17/590,893

(22) Filed: Feb. 2, 2022

(65) Prior Publication Data

US 2022/0253448 A1   Aug. 11, 2022

Related U.S. Application Data

(60) Provisional application No. 63/148,186, filed on Feb. 11, 2021.

(51) Int. Cl.
*G06F 16/215* (2019.01)
*G06F 16/2457* (2019.01)
*G06F 16/2455* (2019.01)
*G06F 16/28* (2019.01)

(52) U.S. Cl.
CPC ...... *G06F 16/24578* (2019.01); *G06F 16/215* (2019.01); *G06F 16/24556* (2019.01); *G06F 16/285* (2019.01)

(58) Field of Classification Search
CPC .......... G06F 16/9535; G06F 16/24578; G06F 16/285; G06F 16/245; G06F 16/90335; G06F 16/24; G06F 16/7867; G06F 16/156; G06Q 10/1053
See application file for complete search history.

(56) References Cited

U.S. PATENT DOCUMENTS 6,704,720 B2    3/2004  Arai et al.
9,165,028 B1 *  10/2015  Christensen ...... G06F 16/24578
(Continued)

OTHER PUBLICATIONS

Notice of Allowance dated May 4, 2022 from US Patent and Trademark Office Re. U.S. Appl. No. 17/544,980. (8 pages).
(Continued)

*Primary Examiner* — Robert W Beausoliel, Jr.
*Assistant Examiner* — Pedro J Santos

(57) ABSTRACT

A method, system and computer program product for database search enhancement and interactive user interface therefor. Database records are ranked by a match score, calculated using a plurality of criteria for determining a match level between values of a record and a search query, and using a plurality of priority parameters for aggregating the match level determined. A plurality of top-ranking records is selected, and a diversity measure is calculated therefor, using at least one class label assigned to records therein. If a sufficiency condition is not met by the diversity measure, at least one reference set of records sharing a class label in common is extracted from the plurality of top-ranking records and analyzed for determining at least one modification to the search query in improvement of the diversity measure, the scoring computational operator is accordingly redefined, and the process reiterates; otherwise, the plurality of top-ranking records is outputted.

20 Claims, 4 Drawing Sheets

(56) References Cited

U.S. PATENT DOCUMENTS

| | | | |
|---|---|---|---|
| 2010/0325148 A1* | 12/2010 | Anderson | G06F 16/3325 |
| | | | 707/769 |
| 2011/0119242 A1* | 5/2011 | Chen | G06F 16/156 |
| | | | 707/723 |
| 2016/0147765 A1* | 5/2016 | Glover | G06Q 30/02 |
| | | | 707/723 |
| 2017/0124091 A1* | 5/2017 | Nowak-Przygodzki | |
| | | | G06F 16/24534 |
| 2018/0189307 A1* | 7/2018 | Yu | G06F 16/221 |
| 2019/0236512 A1* | 8/2019 | Lee | G06Q 10/063112 |
| 2019/0364154 A1 | 11/2019 | Hermanek et al. | |
| 2020/0097560 A1* | 3/2020 | Kulkarni | G06F 16/248 |
| 2020/0372982 A1 | 11/2020 | Nikolova-Simons et al. | |
| 2022/0253414 A1 | 8/2022 | Marcus et al. | |

OTHER PUBLICATIONS

Official Action dated Feb. 14, 2022 From the US Patent and Trademark Office Re. U.S. Appl. No. 17/544,980. (10 Pages).

\* cited by examiner

DATABASE SEARCH ENHANCEMENT AND INTERACTIVE USER INTERFACE THEREFOR

RELATED APPLICATION(S)

This application claims the benefit of priority under 35 USC § 119(e) of U.S. Provisional Patent Application No. 63/148,186 filed on Feb. 11, 2021, the contents of which are incorporated by reference as if fully set forth herein in their entirety.

FIELD AND BACKGROUND OF THE INVENTION

Some embodiments described in the present disclosure relate to information systems and, more specifically, but not exclusively, to database search enhancement and interactive user interface therefor.

Database systems are mighty tools allowing storage and retrieval of data in a structured manner on user demand. Information retained in a database may be researched by way of executing a query which describes or represents the data requested or certain attributes thereof, yielding in return a set of matched results which may be reviewed via a suitable user interface, for example, or transferred to one or more other actors for further processing and/or analysis.

Prominent examples of everyday life practical applications of database systems include patient medical records, job candidate profiles, police case files, and/or the like.

SUMMARY OF THE INVENTION

It is an object of the present disclosure to describe a system and a method for database search enhancement and interactive user interface therefor.

The foregoing and other objects are achieved by the features of the independent claims. Further implementation forms are apparent from the dependent claims, the description and the figures.

According to an aspect of some embodiments of the disclosed subject matter there is provided a method for database search enhancement, comprising: receiving a search query to a database comprising a plurality of records each assigned at least one class label and comprising a plurality of values grouped into a plurality of categories, the search query comprising a plurality of values and priority parameters thereof, grouped into the plurality of categories; defining a scoring computational operator configured for calculating a match score of a record of the database using a plurality of criteria for determining a level of match between values of the record and values of the search query in the plurality of categories, and using the plurality of priority parameters for aggregating according thereto the level of match determined for each of the plurality of criteria; for a collection of at least a subset of the plurality of records, over a plurality of iterations, performing: calculating a match score for a record of the collection by applying thereon the scoring computational operator, ranking records of the collection based on the match score calculated for each, and selecting a sub-collection of top ranked records therefrom; calculating a diversity measure for the sub-collection using the at least one class label of records therein; responsive to the diversity measure not satisfying a sufficiency condition: extracting from the sub-collection at least one reference set of records sharing in common one of the at least one class label assigned thereto; determining, based on analysis of the at least one reference set, at least one modification to the search query in improvement of the diversity measure; and redefining the scoring computational operator in accordance with the at least one modification; and, responsive to the diversity measure satisfying the sufficiency condition, outputting the sub-collection.

According to another aspect of some embodiments of the disclosed subject matter there is provided a method of providing an interactive user interface for database search enhancement, comprising: receiving a search query to a database comprising a plurality of records each assigned at least one class label and comprising a plurality of values grouped into a plurality of categories, the search query comprising a plurality of values and priority parameters thereof, grouped into the plurality of categories; defining a scoring computational operator configured for calculating a match score of a record of the database using a plurality of criteria for determining a level of match between values of the record and values of the search query in the plurality of categories, and using the plurality of priority parameters for aggregating according thereto the level of match determined for each of the plurality of criteria; for a collection of at least a subset of the plurality of records, over a plurality of iterations, performing: calculating a match score for a record of the collection by applying thereon the scoring computational operator, ranking records of the collection based on the match score calculated for each, and selecting a sub-collection of top ranked records therefrom; calculating a diversity measure for the sub-collection using the at least one class label of records therein; responsive to the diversity measure not satisfying a sufficiency condition: extracting from the sub-collection at least one reference set of records sharing in common one of the at least one class label assigned thereto; determining, based on analysis of the at least one reference set, at least one modification to the search query in improvement of the diversity measure; adding the at least one modification to a set of recommendations for modifying the search query; and redefining the scoring computational operator in accordance with the at least one modification; wherein responsive to the class diversity measure satisfying the sufficiency condition, presenting the set of recommendations to a user for soliciting an input therefrom indicative of an approval or rejection respective of each modification; modifying the search query using modifications in the set of recommendations indicated in the input as approved by the user, whereby obtaining a modified search query; and outputting at least a subset of records of the database retrieved by executing the modified search query.

According to yet another aspect of some embodiments of the disclosed subject matter there is provided a system for database search enhancement, comprising: a processing circuitry adapted to execute a code for: receiving a search query to a database comprising a plurality of records each assigned at least one class label and comprising a plurality of values grouped into a plurality of categories, the search query comprising a plurality of values and priority parameters thereof, grouped into the plurality of categories; defining a scoring computational operator configured for calculating a match score of a record of the database using a plurality of criteria for determining a level of match between values of the record and values of the search query in the plurality of categories, and using the plurality of priority parameters for aggregating according thereto the level of match determined for each of the plurality of criteria; for a collection of at least a subset of the plurality of records, over a plurality of iterations, performing: calculating a match score for a record of the collection by applying thereon the scoring computational operator, ranking records of the collection based on the match score calculated for each, and selecting a sub-collection of top ranked records therefrom; calculating a diversity measure for the sub-collection using the at least one class label of records therein; responsive to the diversity measure not satisfying a sufficiency condition: extracting from the sub-collection at least one reference set of records sharing in common one of the at least one class label assigned thereto; determining, based on analysis of the at least one reference set, at least one modification to the search query in improvement of the diversity measure; and redefining the scoring computational operator in accordance with the at least one modification; and, responsive to the diversity measure satisfying the sufficiency condition, outputting the sub-collection.

According to yet another aspect of some embodiments of the disclosed subject matter there is provided a system for providing an interactive user interface for database search enhancement, comprising: a processing circuitry adapted to execute a code for: receiving a search query to a database comprising a plurality of records each assigned at least one class label and comprising a plurality of values grouped into a plurality of categories, the search query comprising a plurality of values and priority parameters thereof, grouped into the plurality of categories; defining a scoring computational operator configured for calculating a match score of a record of the database using a plurality of criteria for determining a level of match between values of the record and values of the search query in the plurality of categories, and using the plurality of priority parameters for aggregating according thereto the level of match determined for each of the plurality of criteria; for a collection of at least a subset of the plurality of records, over a plurality of iterations, performing: calculating a match score for a record of the collection by applying thereon the scoring computational operator, ranking records of the collection based on the match score calculated for each, and selecting a sub-collection of top ranked records therefrom; calculating a diversity measure for the sub-collection using the at least one class label of records therein; responsive to the diversity measure not satisfying a sufficiency condition: extracting from the sub-collection at least one reference set of records sharing in common one of the at least one class label assigned thereto; determining, based on analysis of the at least one reference set, at least one modification to the search query in improvement of the diversity measure; adding the at least one modification to a set of recommendations for modifying the search query; and redefining the scoring computational operator in accordance with the at least one modification; wherein responsive to the class diversity measure satisfying the sufficiency condition, presenting the set of recommendations to a user for soliciting an input therefrom indicative of an approval or rejection respective of each modification; modifying the search query using modifications in the set of recommendations indicated in the input as approved by the user, whereby obtaining a modified search query; and outputting at least a subset of records of the database retrieved by executing the modified search query.

According to yet another aspect of some embodiments of the disclosed subject matter there is provided a computer program product for database search enhancement, comprising: a non-transitory computer readable storage medium; program instructions for executing, by a processor, a method comprising: receiving a search query to a database comprising a plurality of records each assigned at least one class label and comprising a plurality of values grouped into a plurality of categories, the search query comprising a plurality of values and priority parameters thereof, grouped into the plurality of categories; defining a scoring computational operator configured for calculating a match score of a record of the database using a plurality of criteria for determining a level of match between values of the record and values of the search query in the plurality of categories, and using the plurality of priority parameters for aggregating according thereto the level of match determined for each of the plurality of criteria; for a collection of at least a subset of the plurality of records, over a plurality of iterations, performing: calculating a match score for a record of the collection by applying thereon the scoring computational operator, ranking records of the collection based on the match score calculated for each, and selecting a sub-collection of top ranked records therefrom; calculating a diversity measure for the sub-collection using the at least one class label of records therein; responsive to the diversity measure not satisfying a sufficiency condition: extracting from the sub-collection at least one reference set of records sharing in common one of the at least one class label assigned thereto; determining, based on analysis of the at least one reference set, at least one modification to the search query in improvement of the diversity measure; and redefining the scoring computational operator in accordance with the at least one modification; and, responsive to the diversity measure satisfying the sufficiency condition, outputting the sub-collection.

According to yet another aspect of some embodiments of the disclosed subject matter there is provided a computer program product for providing an interactive user interface for database search enhancement, comprising: a non-transitory computer readable storage medium; program instructions for executing, by a processor, a method comprising: receiving a search query to a database comprising a plurality of records each assigned at least one class label and comprising a plurality of values grouped into a plurality of categories, the search query comprising a plurality of values and priority parameters thereof, grouped into the plurality of categories; defining a scoring computational operator configured for calculating a match score of a record of the database using a plurality of criteria for determining a level of match between values of the record and values of the search query in the plurality of categories, and using the plurality of priority parameters for aggregating according thereto the level of match determined for each of the plurality of criteria; for a collection of at least a subset of the plurality of records, over a plurality of iterations, performing: calculating a match score for a record of the collection by applying thereon the scoring computational operator, ranking records of the collection based on the match score calculated for each, and selecting a sub-collection of top ranked records therefrom; calculating a diversity measure for the sub-collection using the at least one class label of records therein; responsive to the diversity measure not satisfying a sufficiency condition: extracting from the sub-collection at least one reference set of records sharing in common one of the at least one class label assigned thereto; determining, based on analysis of the at least one reference set, at least one modification to the search query in improvement of the diversity measure; adding the at least one modification to a set of recommendations for modifying the search query; and redefining the scoring computational operator in accordance with the at least one modification; wherein responsive to the class diversity measure satisfying the sufficiency condition, presenting the set of recommendations to a user for soliciting an input therefrom indicative of an approval or rejection respective of each modification; modifying the search query using modifications in the set of recommendations indicated in the input as approved by the user, whereby obtaining a modified search query; and outputting at least a subset of records of the database retrieved by executing the modified search query.

Optionally, the at least one reference set comprising a class members set of records which the shared class label thereof indicates membership in a class of interest.

More optionally, the analysis comprising calculating for a criterion of the plurality of criteria a measure of consensus among records of the class members set respective of the criterion, and determining the at least one modification comprising determining, based on the measure of consensus, at least one of: an increase of a respective priority parameter of the criterion; a decrease of the respective priority parameter of the criterion; and a removal of the respective value of the criterion from the search query.

More optionally, the analysis comprising: selecting, from a record of the class members set, a value in one of the plurality of categories for which no respective criterion being comprised in the plurality of criteria; defining a criterion for determining a level of match between values of a record of the database and the value in the respective one of the plurality of categories; and, calculating for the criterion a measure of consensus among records of the class members set of records respective of the criterion; and determining the at least one modification comprising determining, based on the measure of consensus, whether to add to the search query the value in the respective one of the plurality of categories.

Optionally, the at least one reference set further comprising a class non-members set of records indicated by the shared class label thereof as non-members of the class of interest.

More optionally, the analysis comprising: calculating for a criterion of the plurality of criteria a first measure of consensus among records of the class members set respective of the criterion, a second measure of consensus among records of the class non-members set respective of the criterion, and a ratio between the first and second measure; and wherein determining the at least one modification comprising determining, based on the ratio, at least one of: an increase of a respective priority parameter of the criterion; a decrease of the respective priority parameter of the criterion; and a removal of the respective value of the criterion from the search query.

More optionally, the analysis comprising: selecting from a record of the class members set of records a value in one of the plurality of categories for which no respective criterion being comprised in the plurality of criteria; defining a criterion respective of the value for determining a level of match between values of a record of the database and the value in the respective one of the plurality of categories; and calculating for the criterion a first measure of consensus among records of the class members set respective of the criterion, a second measure of consensus among records of the class non-members set respective of the criterion, and a ratio between the first and second measure; and wherein determining the at least one modification comprising determining, based on the ratio, whether to add to the search query the value in the respective one of the plurality of categories.

Optionally, the sufficiency condition is set using a baseline diversity measure calculated for a baseline collection of records of the database retrieved using a baseline query derived by selecting a subset of the plurality of values from the search query using at least one default category of the plurality of categories.

Optionally, the diversity measure is a measure calculated respective of member records sharing in common a class label indicating membership in a class of interest, the measure being selected from the group consisting of: a percentage of member records from a total of records in the collection; an aggregation of gains in density per bin of member records, wherein a total of records in the collection being divided into a plurality of bins according to the respective match score calculated for each; and an increase in an aggregate over member records of the respective match score calculated for each.

Optionally, prior to selecting the sub-collection, records of the collection are reranked by grouping records of a same respective match score together and giving precedence within a same group to member records which the class label shared in common thereof indicates membership in a class of interest.

Optionally, a subset of the plurality of categories in optimization of the diversity measure is determined, wherein the search query being modified to exclude therefrom respective values in a category of the subset.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DESCRIPTION OF SPECIFIC EMBODIMENTS OF THE INVENTION

Figure 1:
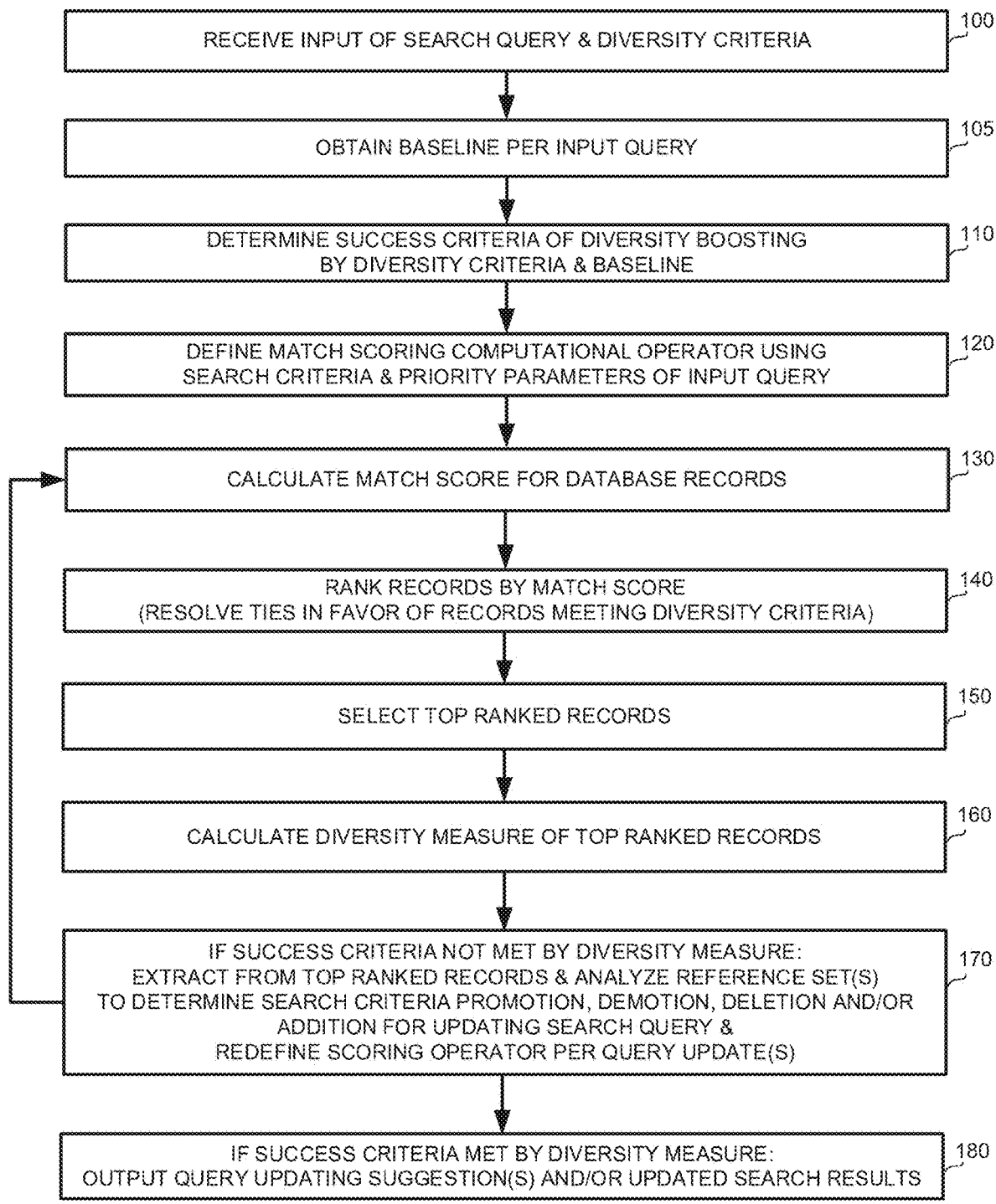
FIG. 1 is a flowchart of an exemplary method for database search enhancement, according to some embodiments.

Some embodiments described in the present disclosure relate to information systems and, more specifically, but not exclusively, to database search enhancement and interactive user interface therefor.

Database systems enable users to retrieve and browse data records and information retained therein by executing a search query submitted by a user and returning in result only those records that match the query in whole or in part. In some contexts, however, the user may be interested also in heterogeneity or specific distribution of the set of results obtained, e.g., with respect to a particular quality or attribute of interest, while at a same time preserving an adequate match with the query.

One exemplary real-life scenario being illustrative in the context of the present disclosure is the challenge of labor force diversity. Empirical findings indicate clear disparity in diversity levels relative to general population statistics. Additional difficulty is due to the job market and diversity thereof being a moving target, as many current jobs did not exist only several years ago. On the other hand, minorities may not get an opportunity to become established in a field as other more established populations might. Studies show trends of diminishing diversity at later career stages and over time in the past decades. While job market pressure to improve diversity increases, current industry approaches focus on methodology, e.g., measurements of diversity, suggestions of changes to common practices, and/or the like, with little focus on tools to facilitate improvement. Such approaches suffer from limitations and drawbacks, due to favoring diversity statistics over qualifications, leading to less qualified candidates and hires.

In some embodiments, database search may be enhanced by determining at least one modification to a respective search query in improvement of a diversity measure of results returned therefor, while maintaining a sufficient level of match therewith among such results. The diversity measure may be calculated based on a classification of database records in one or more classes, such as, for example, as members or non-members of a class of interest. The classification may be specified within a database record in a form of a labeling. A database record may be assigned with single or plural class labels.

In some embodiments, a database record may comprise a plurality of values grouped into a plurality of categories. The search query may comprise at least one value in at least one category and optionally at least one priority parameter representing a level of importance for matching a respective value, i.e., that for a database record returned in result responsive to execution of the search query, the value being present in that record in the respective category.

In some embodiments, a scoring computational operator for calculating a match score of a database record with respect to a search query may be defined. A set of criteria for determining a level of match between values of the record and values of the search query in respective categories may be defined and used for defining the scoring operator. The match levels determined by the set of criteria may be aggregated by respective priority parameters, such as may be specified in the search query and/or otherwise obtained, as described herein.

In some embodiments, the scoring computational operator may be used for calculating a match score for records of a database or a subset thereof, ranking records according to the match score calculated for each and selecting a set of top ranked records. The top ranked records set may be selected based on size, e.g., a set of a size N of records with highest scores, where N being a natural number. Additionally or alternatively, the set of top ranked records may be selected based on a threshold applied to the match score, such that the set may contain only records with a match score exceeding the threshold chosen.

In some embodiments, a diversity measure may be calculated for the set of top ranked records, based on classification thereof per at least one class label assigned thereto. The diversity measure may be defined with respect to a class of interest which membership therein being indicated by the at least one class label. The diversity measure may be calculated for example as a percentage of records being members of the class of interest, an aggregation (e.g., a sum, an average, and/or the like) of gains in density per bin of records being members of the class of interest given a division of records into bins by match scores, an increase in an aggregate of match scores of records being members of the class of interest, and/or the like.

In some embodiments, the diversity measure may be checked against a sufficiency condition. The sufficiency condition may be set using a baseline diversity measure. The baseline diversity measure may be calculated by obtaining a baseline set of results returned in response to a baseline query. The baseline query may be derived from a search query as originally submitted by a user. The baseline query may comprise a subset of values selected from values of the search query in at least one default category.

In some embodiments, in case of the diversity measure not satisfying the sufficiency condition, at least one modification of the search query in improvement of the diversity measure may be determined. The modification determination may be made using at least one reference set of records extracted from the set of top ranked records. A reference set may consist of records sharing in common a class label, i.e., being members of a same class. The at least one reference set may be analyzed to determine what modification(s) to the search query may yield in result a different set of records for which the diversity measure would improve in comparison. The scoring computational operator may be redefined according to the modification(s) determined. The procedure may be performed iteratively until the sufficiency condition being satisfied by the diversity measure of the top ranked records set obtained for the (optionally modified) search query, in which case the top ranked records may be provided as output.

In some embodiments, the at least one modification to the search query may comprise increasing or decreasing a priority parameter of a respective value, removing or adding a value in a category, and/or the like. A modification may be determined based on a consensus measure with respect to a value among top ranked records classified as members of the class of interest, and/or among top ranked records classified as non-members thereof. The consensus measure may be calculated using a respective one of the set of criteria for determining the level of match between values of a record and the search query, and/or a criterion similarly defined for a value selected from a record classified as member of the class of interest. In some further embodiments, a ratio between the consensus measures among members and non-members respectively may be calculated and based thereon the modification may be determined.

In some embodiments, prior to selecting the set of top ranked records, reranking may be performed where records having a same match score may be grouped together and records being classified as members of the class of interest within a same group may be given precedence over other records of that group.

In some embodiments, the diversity measure may be optimized by determining a subset of categories and modifying the search query so as to exclude therefrom values in a category of the subset.

For illustrative purposes and ease of understanding, an exemplary embodiment of the disclosed subject matter is described herein at further detail with respect to search enhancement in a database of professional profiles of persons, also referred to herein as "talents", that can be queried and researched for choosing therefrom suitable candidates or applicants for a job opening or vacant position based on contents of their respective profiles, i.e., qualifications and/or skills specified therein. However, the disclosed subject matter is not meant to be limited in such manner and may be practiced similarly for any likewise collections of structured information where diversity of matching search results retrieved therefrom is sought after.

By utilizing the disclosed subject matter, diversity of applicants may be raised without sacrificing talent quality or suitability for the job, through intelligent and optionally iterative morphing of job requirements which may be performed interactively with a user (an employer, a recruiter, and/or the like). The criteria used to qualify talents for the position may be boosted (optionally iteratively) in a way that increases the diversity mix while maintaining level of the talents' qualification for the position.

As can be readily understood by a person skilled in the art, in order of improving or boosting diversity of a given collection of talents, a pre-processing stage of classification may be required during which talents may be classified according to the diversity attributes to boost. Optionally automated classification techniques and/or tools may be employed for accomplishing such task.

In the context of workforce hiring, 'diversity' may be considered as an umbrella term which may refer for example to gender (i.e., female, male, other), ethnicity (e.g., Latinx, Caucasian, African American, and/or the like), race, religion, country of origin, situational diversity (e.g., army veterans), and/or any other likewise categories and/or distinguishing attribute(s) of a population of talents.

In order to provide for search enhancement in accordance with the disclosed subject matter, such as for example in the context of improving diversity of search results retrieved from a talents database to facilitate thereby improved diversity in hiring, there may be a need to define one or more of the following: (a) units of diversity; (b) diversity measure(s) and/or measuring algorithm(s); (c) criteria for success of diversity improvement.

It would be appreciated by a person skilled in the art that, in some embodiments, diversity may not be a single-valued attribute but rather a multi-valued one, for example, a talent can be both female and Latino, which may be of importance in the context of defining units of diversity and/or diversity measuring.

An exemplary definition for units of diversity is discussed herein. As noted previously, diversity may include for example gender, ethnicity, race, religion, and/or any likewise distinguishing attribute of a population of talents. For illustration purposes and ease of discussion, in the present disclosure diversity in candidates for hiring may be discussed in terms of 'females' and 'males', however the disclosed subject matter is not meant to be limited to gender but rather may be similarly applicable to all aspects and/or variations of diversity.

In the context of the present disclosure, the term 'population' may refer to a collection of talents having the same diversity in common. Populations may appear in several contexts, such as, for example, those that appear in the Top-N results of running the input query, or some subdivision of the Top-N results (i.e., binning), those that appear outside the Top-N results (i.e., having a ranking greater than N, for example, a female ranked 421 in a Top-400 ranking), and/or the like.

It would be appreciated that it may be possible that as the result of search enhancement according to the disclosed subject matter a talent can rise in ranking and enter the top-N list, as described herein.

In some exemplary embodiments, the unit of measurement may be simply the count of individual instances (e.g., talents) in the population, namely, the population's size.

Exemplary diversity measures and measuring algorithms are discussed herein. In some embodiments, a measuring algorithm may entail a methodology to identify and measure diversity in a collection of instances and/or a specific population therein. One exemplary algorithm may count diversity in the collection, i.e., the number of instances belonging to the population. Another exemplary algorithm may measure average ranking in a population, e.g., according to a match score for a search query. Yet another exemplary algorithm may separate the population into bins (also referred to as buckets) and provide counts and/or other statistics for each bin. It will be appreciated that the disclosed subject matter is not limited to the measuring algorithms described herein and that other possibilities of diversity measures and/or measuring algorithms may be similarly employed thereby.

In some embodiments, an algorithm to compare population measurements vis-à-vis criteria for success may be employed, for example, a ratio between measurements of 'females' and 'males' populations may be calculated and evaluated against a target value, and/or the like.

Additionally or alternatively, an algorithm to determine if the success criteria have been met may be employed.

Optionally identification of the metric and/or the measuring algorithm which optimize the boosting of the diversity mix (as measured by the criteria for success) may be performed, for example, via a trial-and-error process and/or the like.

Exemplary criteria for success in improving diversity are discussed herein. It will be appreciated that there may be many possibilities to establish the criteria for successful boosting of diversity, similarly as in the case of measuring algorithms and their ample variety. One exemplary metric for measurements of diversity boosting may be calculated by counting how many of each population (females, males) appear in the results of running the search query interactively constructed with the user (employer/recruiter). There may be several variations to this metric, such as for example dividing the output population into bins and measure net changes in bins, and/or the like. Another exemplary metric may be calculated by measuring distributions of each population and looking for gains in density per bin or improvements in ranking.

Optionally the overall criteria for success may be requiring a configurable percentage increase in diversity mix relative to the initial query and a baseline query, such as for example a geographical query by which all talents located at a certain geographical region relevant to the position may be retrieved. The baseline collection obtained as output for the baseline query and/or analysis thereof may be utilized in determination of the success criteria, for example as in case where one may be interested to raise diversity mix to at least the diversity of the local population qualifying for the job and even improve on it, and/or the like.

An exemplary boosting algorithm is discussed in further detail herein. A high-level view of the exemplary boosting algorithm may be outlined as follows:

(a) Run a search using the initial criteria defined by the user (e.g., an employer/recruiter)
(b) Run a search within a predetermined subset of the initial criteria defined (e.g., the location and job titles specified by the input query)
(c) Measure the diversity in the results in order to establish a baseline for measuring success
(d) Iterate
    Boost the criteria subject to maintaining level of output match (e.g., talent quality) with the goal of improving diversity
        Generate an updated query (the criteria used to identify matching results, e.g., qualified talents)
    Run a matching search using the updated criteria
    Measure the diversity in the new result
    Use the criteria for success to determine if the procedure boosted sufficiently
    If yes, the procedure ends
    If no:
        Prepare for next iteration by intelligently selecting different boosting strategies
        Iterate
(e) If successful boosting: report change to the user
(f) If no successful boost can be found, then adapt interactively with the user the initial input query (e.g., the criteria that effectively describe the job) and retry from step (a)

As an illustrative example of determining the criteria for success using the baseline output, assuming that the local diversity shows that 15% of the matching labor force in the local area are women, then it may not be reasonable to expect that the updated diversity be 50% women, unless artificial boosting is employed (e.g., results may be filtered to include mostly or all women but that may be considered as 'reverse discrimination' and therefore similarly undesired).

In some embodiments, the boosting algorithm may be internally constructed as an extension of a K-Nearest-Neighbors (KNN) machine learning algorithm, as discussed herein.

An exemplary searchable database architecture in which the disclosed subject matter may be utilized is described herein. A searchable talent database, for example, may comprise a collection of records each comprising talent attributes that may include, for example: job title, skills, education, languages, and/or many other likewise attributes.

A query may be a collection of criteria applied to any of the talent attributes (such as for example, searching for a job title and/or the like). A criterion may specify a single attribute value to be matched. The level of matching may be scaled between 0 and 1 where 0 is a non-match, 1 is a full match, and intermediate values represent a partial match. An example of a partial match may be searching for a job title as the current one but finding that the talent had the job title previously and not holding it currently.

Within a query, the criteria may be grouped into main categories (such as for example: skills, job titles, experience level, education, and/or the like). The category groupings are referred to herein also by the term 'filters'.

Each filter may be assigned a configurable and/or dynamic weight which may affect the relative contribution of the filter to the overall scoring (i.e., quantification of a match of a talent to the query in overall). Each criterion within each filter (category) may be assigned a level of importance (ranging from optional to must-have, for example). Each criterion may be assigned a relative weight, which may be determined for example based on the rarity of the value it checks for (the rarer the attribute value the higher the weight), and/or using any likewise function. Additionally or alternatively, relative weights may be assigned to criteria individually and/or collectively to all criteria within a same category by a user, e.g. an employer, recruiter and/or the like.

The searchable talent database may use queries to select talents. Its internal matching algorithms may search the talents and compute a score between 0 (no match) and 1 (full match) to each criterion. A total talent score may be computed for each talent based on the filters and criteria that match (fully or partially). Each talent score may be between 0 and 1 (where '1' may be a perfect match of all criteria).

In some embodiments, the scoring system may have one or more of the following characteristics:
    Increasing the level of importance of a criterion that matches may raise the talent score (conversely, lowering it may reduce the score)
    Increasing the filter's weight may raise the talent's query score (if filter matches; otherwise, the score may drop proportionately)
    Adding new criteria that match may increase the score; removing criteria that match may lower the talent's score In some embodiments, a diversity boosting optimization procedure may receive one or more inputs such as the following:
    A search query representing an output target designation (e.g., a job posting); the query may comprise a collection of filters, criteria, search settings (e.g., criteria priorities), and/or the like
    A set of selection criteria for diversity, which may comprise selection criteria of a population to be boosted (e.g., selecting female talents as the population to boost), selection criteria of a population to be de-boosted (e.g., selecting male talents as the population to de-boost), and/or the like Details of an exemplary diversity boosting algorithm and its operation are discussed herein.

In some embodiments, a first step in diversity boosting may be to run the initial query on the database or a subset thereof. Diversity selection criteria may be obtained as input received and/or default settings and used to extract two populations (for example, females and males) from the top N ranked results (i.e., N-most qualified talents for the position, where 'N' is a configurable natural number, for example, it may be set to 400). These two populations may serve as the starting point for the diversity mix against which success of boosting may be measured.

In some embodiments, a unit of boosting may be done in one or more stages such as the following:
    (1) Optimize (boost) the criteria in the input query to improve diversity (without sacrificing talent quality). Boosting may optionally comprise one or more of the following:
        a. Filter (a category within the query) promotion (increase importance when calculating the final query score)
        b. Filter demotion (decrease importance when calculating the final query score)
        c. Filter exclusion (remove filter from query)
        d. Criteria promotion (increase criterion importance within the filter)
        e. Criteria demotion (decrease criterion importance within the filter)
        f. Criteria deletion (remove criteria from filter)

(2) Create additional criteria to match the attributes of the diversity talents not already queried for. Determination of criteria to be added, i.e., which talent attributes, if any, would boost diversity, may be performed using look-alike algorithms as described herein.

In some embodiments, one or more optimization schemes of the following types may be performed: (1) Quorum-based; (2) Contrasting population-based.

Quorum-based optimization may attempt to boost using just the target population (one to be boosted, e.g., female talents) extracted from the results of the input query as a model. This population may also be referred to as the 'positive instances' population.

A criterion in the query may be checked against the positive instances collection. A count of positive instances matching the criterion, a sum of the respective match scores calculated therefor, and/or any likewise aggregate thereof, may be computed. The result may be taken as the 'quorum'—a measure of consensus among the positive instances (female talents) collection regarding the criterion in question.

A criterion with a high quorum value may imply that the criterion's attribute value may be common among the positive instances (female talents) population and may therefore be eligible for criteria promotion (its relative importance level should be increased). Correspondingly, a low quorum value may imply rarity—the criterion may then be eligible for demotion or deletion (the importance level of the criteria should be lowered, or the criterion deleted).

In some embodiments, the same approach may be used when deciding to introduce new criteria. For example, a quorum may be generated for all talent attributes found in the positive talents population for which there was no criteria in the input query. When a high enough quorum being found, a criterion may be eligible to be added to the input query for that attribute. The associated importance level may be proportional to the quorum characteristics (such as for example absolute count, fraction of total, and/or the like).

The Quorum-based optimization may thus tune the match criteria in the query to search for look-alikes of the positive instances (female talents) collection.

It will be appreciated one quality of this approach is that it certainly boosts (raises the scores of) the positive instances (female talents) collection. The downside is that improving the look-alike of the query can also improve the scores of the 'negative' population (male talents). For example, if 83% of the positive talents (females) collection have a skill of 'java' then the quorum-based optimization would raise the importance level of this attribute (or add the criterion if not already in the query). However, it may also be true that 94% of the male population also have 'java' skill. In this case such approach would be relatively de-boosting the population desired to be boosted.

Contrasting population-based optimization may attempt to use both the positive instances (female talents) as the target population and the negative instances (male talents) as the contrasting population to anticipate whether a change in a criterion would ultimately improve the diversity or not.

It will be appreciated that while such approach may pose greater technical challenge, it may, however, be intuitively easy to understand.

If enough positive instances (relative to the negative instances) have the attribute searched by the criterion (a matching), then raising the criterion's level of importance should improve diversity. Similarly, if enough negative talents (relative to the positive talents) match the criterion then a prudent approach would be to reduce the importance level of the criterion or perhaps even delete the criterion from the query.

It will be appreciated however that as intuitive as this approach may seem, there may be many 'edge' cases that may affect the boosting results. These edge cases may arise from one or more of the following:

The populations (positive versus negative instances) may often be of unequal size Both populations may have unequal representation in the results of the input query Diversity in the database may vary dramatically (e.g., as discussed herein with regard to criteria for success)

As an illustrative example, one may consider the case where out of the positive population of 25 women in total there may be 10 women who match the criterion (40% match) and 15 men out of the negative population of 80 men in total who match as well (18.75% match). A simple quorum-based decision would indicate that the importance of the criterion should be lowered since 10 women is less than 15 men. Lowering the importance level of the criterion would certainly lower the score of the 10 women, and of the 15 men as well.

However, lowering the scores runs the risk that some female talents may no longer appear in the top-N results. Moreover, it may be likely, especially since there may be more men than women in the database, that more women than men would drop out of the top-N results and thus the diversity may be reduced overall.

If only the percentage of match in the population being considered, then the 40% match for women versus just 18.75% of the men would suggest that raising the importance level of the criterion would be the correct boost. However, here too one edge case may be that more men from the database population might enter the top-N matching results to the detriment of the diversity that one may be trying to boost.

It will further be appreciated that one additional factor that may come into play may be the unknown relative scoring gap between top-N matching results and instances ranked immediately below. When selection of the top-N (best) scoring instances (talents), it may not be known to the user how close instances ranked as number N+1, N+2, and so forth came to be included in the top-N, i.e., were they edged by a small amount (e.g., 0.00001) or were they overwhelmed by a landslide (e.g., 0.5)? This factor may affect, possibly significantly whether an instance may drop out of the top-N results or may newly enter it when running the updated query. For instances very close to the score of the last entry in the top-N matches, even a small change to the query can result in significant changes in the top-N results.

In some embodiments, in order to get a better estimate of the predicted change to the top-N matches as a function of the boosting changes, the relative populations in the database of the diversity to be boosted may we have to be taken into account both in terms of unqualified (those that did not make the top-N matches) and those that become qualified due to the change in the criterion.

As an illustrative example, assuming that in a talents database the gender distribution of talents with a 'Top Management' attribute being as follows:

Female: 27.3%

Male: 68% (a significant disparity)

Other (unknown, gender unspecified): 4.7%

As a person skilled in the art would readily appreciate, by increasing the importance of a criterion, the resulting effects may be as follows:

Those talents in either population who did match the criterion will see their score rise Those talents in either population who did not match the criterion will have their score unchanged Those in the database but not in top-N results who match the changed criteria will see their score rise.

Similarly, by decreasing the importance of a criterion, the resulting effects may be as follows:

Those talents in either population who did match the criterion will see their score fall Those talents in either population who did not match the criterion will have their score unchanged Those in the database but not in the top-N results:

If they matched the changed criteria, they will see their scores fall.

If they did not match, their scores will remain unchanged

In both of the above cases, the last group (those not initially in the top-N results) can skew the top-N results. Their scores may rise sufficiently to be included in the top-N results of the updated query, or talents in the top-N results can drop out and other talents join the top-N results with the overall effect that diversity can actually decrease.

In some embodiments, a likelihood for a criterion added to the search query to yield improvement in diversity of the results may be calculated and based thereon a determination which criteria to add to the query may be made. An exemplary algorithm for such likelihood calculation is described herein. An input query (i.e., the query to be boosted) may be run against the database. From the top-N matches returned, the following may be extracted: (i) positive population—instances of the diversity to be boosted (e.g., female talents); (ii) negative population—instances of the diversity to be de-boosted (e.g., male talents); (iii) unspecified population—instances that may neither be identified as positive or negative, i.e., all the rest. For the positive population, a set of all match criteria for respective values in each of the categories (e.g., skills, job titles, education, etc.) may be formed, excluding any criteria explicitly specified in the input query. For each criterion in the set, a quorum within the positive population may be computed, using an aggregate of the match scoring of those instances in the positive population that match the criterion, such as a weighted sum and/or the like. Similarly, a quorum within the negative population may be computed for each of the criteria in the set, as well as within the unspecified population. Using the quora in the positive, negative, and unspecified population, an imbalance index may be computed as described herein. The negative quorum may be adjusted by a configurable weight value W ($0<=W<=1$) times the quorum of the unspecified population. The count of instances in the negative population may be adjusted by W times the size of the unspecified population. The imbalance index may be computed as:

$$imbalanceIndex = \frac{(\% \ pos - \% \ neg) * ABS(\% \ pos - \% \ neg)}{\% \ pos + \% \ neg}$$

where:

% pos—percentage of positive instances in the top-N results

% neg—percentage of negative instances in the top-N results (by adjusted count)

ABS( )—absolute value

Notably, using percentages may not take into account absolute magnitudes of the populations. For example, finding a criterion if 4 talents out of 10 (40%) is very different from finding it in 400 (same 40%) out of 1000. Thus, a scaling factor to be used for normalization of the imbalance index may be computed as described herein. An adjusted total of instances may be calculated as: adjusted total=count of positive population+adjusted count of negative population. A scaled total may then be calculated as: scaled total=(adjusted total)/(a configured zero-point value). The scaling factor may then be calculated as:

$$scaling \ factor = \frac{MIN(positive \ quorum + adjusted \ negative \ quorum, scaled \ total)}{scaled \ total}$$

The normalized imbalance index may then be obtained as:

$$normalized \ imbalance \ index = imbalanceIndex * scaling \ factor$$

It will be appreciated that the normalized imbalance index thus computed may yield a scalar value that takes into account the relative quorum of the populations contrasted against one another (i.e., positive versus negative), and any imbalance in the population sizes in addition to that. This value may have the property that the higher the value the more likely the adding of the criterion to the query may improve the diversity of the results.

In some embodiments, since just looking at quorums and/or at ratios of the population that matched a possible criterion change may not be enough for achieving the goal of improving diversity, in order to overcome the shortcomings of such limited approaches modelling of the top-N stack may be performed in addition thereto.

In some embodiments, a mechanism may be employed for dealing with 'noise' filters and associated criteria that the input query may often contain. Noise criteria may be those ones that may not really be germane to the search target (for example, specifying a school with the lowest priority relevance in a job specification). To address the noise, a scheme of filter/criteria toggling may be used as described herein.

The term 'toggling' as used herein may refer to a situation where the boosting of specific filters/criteria may be selectively turned on/off (that is, any boosting changes to the filter/criteria in the input query may be bypassed by result).

In some embodiments, iteration through the combinations of toggling the individual filters or some subset thereof may be performed. When the number of possible toggles being relatively small, iteration through all the combinations may be performed. When the number of permutations being large a subset of all the possible permutations may be intelligently selected. This may be prudent since testing each permutation of toggled filters may be CPU intensive (in each iteration the query may be modified, and the boosting algorithm may be run again).

The best boosting from all the toggles may then be selected and applied. It will be appreciated that toggling can improve, sometimes significantly, the final diversity boost gains.

As a person skilled in the art may readily appreciate, the full toggling may be construed as a combinatorics problem. If there are M filters in the input query, then there are $2^M$ possible combinations of filters toggled on/off. For a small M (where M may be a configurable value), the value of $2^M$ is small. But for larger M trying to boost all the possible combinations ($2^M$) may simply take too long.

In some embodiments, a procedure enabling to intelligently sample the $2^M$ permutations of toggling may be employed as described herein.

A serial toggling on of just one filter and its mirror image (i.e., toggling on all but the selected filter) may be performed. The toggled-on filter or mirror image with the best results may then be selected (the best results' filter may thus be selected to be toggled permanently on or off). The toggling may then be recursively repeated with one fewer filter in a successor iteration. At each iteration step 2K filters may be toggled (with K descending from M down to 1, where the factor of 2 comes from toggling just one filter on and toggling all but the one filter selected on). The total number of permutations thus evaluated may be M*(M+1). As M gets large it may be a major improvement compared to $2^M$.

In some embodiments, scoring ties may be detected and used for enlarging the share of the positive population in the top-N results. As scores of instances in the database (e.g., talents) may come in discrete values, the top-N results list may be made up of groups of instances with identical scores. For example, there may be $n_1$ talents with the score of $s_1$, $n_2$ talents with the score of $s_2$ (where $s_2 < s_1$), and so forth. When the top-N results being selected usually a portion of the group straddling the total N may be taken, which means that only part of the last group may be taken.

Optionally all the scoring groups may be sorted by the desired diversity (for example, female talents may be placed before male talents within a same scoring group). It will be appreciated that the instances within a scoring group being scored identically so any ordering within that scoring group may be acceptable as conforming to the query. This pre-sorting moves the desired-diversity instances to the top of each group, which thus achieves two goals: enriching the number of diversity instances that appear in the top-N matches and raising the rank (order in the top-N results) of diversity instances.

In some embodiments, modelling of the top-N results for predicting diversity boosting may be further improved using one or of the following:

Looking at diversity counts by talent attribute (for example, the number of women and of men in the database with 'java' in skills), the corresponding numbers in the locality of the search, the distribution just below the top-N stack, and/or the like Diversity distribution within the top-N stack Internally enlarging the 'N' and keeping a respective top-M stack (where 'M' may be suitably larger than 'N')

It will be appreciated that by having knowledge of diversity distribution immediately below the top-N stack better prediction can be made of the net changes to the diversity in the top-N results that may be caused by criterion promotion, demotion, deletion, and/or addition.

As a person skilled in the art may readily appreciate, ultimately there may be a tradeoff between ability to boost, accuracy and computation time. Without limits on computation time, an ultimate algorithm for boosting diversity may become trivial such as the following:

Try all possible changes (singly and in combination) of criterion boosting/de-boosting or criterion demotion/deletion, or criterion addition along with all combinations of filter relevance boosting, demotion, or deletion Select the boosting combinations that improves diversity the most while maintaining talent quality While unfortunately such approach may not be tenable in practical applications, this ultimate algorithm may nevertheless be the 'golden standard' against which diversity gain may be measured. One may expect to see significant gains in the initial phases of the diversity boosting algorithm. One may also expect decreasing gains the better the boosting may get. The asymptotic behavior of the gains may be a good indication of how close the boosting algorithm may be compared to the ultimate algorithm.

In some embodiments, the underlying algorithm may be implemented as an Interactive Iterative Adaptive K-Nearest-Neighbors (IIA-KNN) machine learning algorithm. The algorithm may create one or more clusters of the following types: (1) matching diversity criteria (for example, females); and (2) not matching diversity criteria (for example, males). Each cluster may be dynamically adjusted (interactively and/or iteratively). The clusters may be populated using search criteria applied to the database (i.e., point instances in the clusters may be representative of database records). Membership in the clusters may be based on one or more of the following criteria: (A) matching the diversity requirement (or not); and (B) being added by look-alike algorithm which identifies the most similar instances given a sample of (other) instances. Boosting performed by the algorithm may dynamically adjust the parameters of instance selection criteria while maintaining results quality (i.e., sufficient level of match with the input query). The algorithm may apply one or more of the following strategies for boosting: (i) adjusting selection criteria based on quorum of properties, where high quorum promotes criteria and low quorum demotes or deletes criteria; and (ii) adjusting selection criteria based on contrasting populations, optionally taking differences in quorums between clusters as a factor in determining boosting to be performed. The clusters may be adaptive and iteratively recalculated based on boosting results and user interaction (e.g., employer/recruiter feedback).

In some embodiments, preferences of the user may be learned from iterative interaction therewith to better predict types of boosts which the user accepted and/or rejected.

One technical effect of utilizing the disclosed subject matter is providing for a generally available, largely automated tool for diversity boosting of database search results without compromising or sacrificing search output quality (e.g., qualification of talents for the position). The disclosed subject matter may incorporate use of one or more of the multiple metrics for measuring diversity as discussed herein, such as for example: simple population counts, diversity density in query results, ranking and/or aggregates thereof over populations (e.g., top-N selection of best scoring instances, mobility within the ranking, etc.), and/or any likewise metrics. The disclosed subject matter may employ predictive modeling of changes, thereby allowing prediction of impact of any proposed boosting change, allowing solutions to the underlying optimization problem to follow maximal progression (gradient of steepest ascent towards solution), eliminating a lot of trial and error, and homing in on the best boosting.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a flowchart of an exemplary method for database search enhancement, according to some embodiments.

At 100, an input comprising a search query and diversity criteria may be received. The search query may be configured for querying a database comprising a plurality of records, wherein a record of the database comprises a plurality of values grouped into a plurality of categories and is assigned at least one class label. The search query may comprise a plurality of values and priority parameters thereof, grouped into the plurality of categories. The priority parameters may be specified by a user or automatically set per default values. The diversity criteria may specify a class label which the search in the database is to be enhanced with respect thereto.

For example, the database may be a talents database comprising a plurality of talent profile records, each talent profile comprising talent data such as personal details (e.g., name, address, contact information, and/or the like), job titles, education, skills, languages, and/or the like and assigned with one or more diversity labels such as gender (male/female/unspecified), ethnicity (Caucasian, Latinx, African American, Asian, etc.), and/or the like. The search query may specify qualifications of a position opening, such as title, skills, and/or the like. The priority parameters may be numerical values reflecting an importance of a candidate possessing the respective skills, e.g., whether a skill is a "must have" or merely advantageous. The diversity criteria may specify a diversity of a population to be boosted in the search results, e.g., female talents.

At 105, a baseline collection of database records may be obtained, based on the input search query received at 100. The baseline collection may be a set of matching results retrieved in response to a baseline query derived from the input query by selecting values thereof in a predefined subset of the plurality of categories. For example, the baseline query may comprise a job title and a geographical location of work premises, extracted from the initial input query.

At 110, success criteria of diversity boosting may be determined in accordance with the diversity criteria received as input at 100. The success criteria determination may be made using the baseline collection obtained at 105. For example, the success criteria may be achieving a share of diversity among top matching results that is proportionate to the share of diversity in the baseline collection.

At 120, a match scoring computational operator may be defined using search criteria for determining a level of match between values of the input search query received at 100 and values of a record of the database. The match scoring computational operator may be configured to aggregate the levels of match as determined by the search criteria according to the respective priority parameters of the search query, using a predetermined aggregation scheme, such as for example, a weighted sum and/or the like.

At 130, a match score may be calculated for records of the database or subset thereof, using the scoring operator defined at 120.

At 140, records may be ranked by the match score calculated therefor at 130. Optionally, ties (i.e., same match score for different records) may be resolved by sub-sorting records with same scores so that records matching the diversity criteria received at 100 may come first within a respective sub-group of a same scoring.

At 150, a set of top ranked records may be selected based on the ranking of 140. The top ranked records set may be selected as the set of the top N records in the ranking, where N being a configurable natural number. Additionally or alternatively, records may be selected to the top ranked set by applying a predetermined threshold on the match score calculated therefor at 130.

At 160, a diversity measure of the top ranked records in the set selected at 150 may be calculated. The diversity measure may be calculated respective of records sharing in common a class label denoting membership in a class of interest, such as for example, a desired diversity type. The diversity measure may be for example a percentage of member records from a total of records in the set, an aggregation of gains in density per bin of member records per a predefined division into bins by match scores as calculated at 130, an increase in an aggregate of match scores of member records in the top ranked set, and/or the like.

At 170, if the diversity measure calculated at 160 fails to meet the success criteria determined at 110, at least one reference set may be extracted from the top ranked records selected at 150 and analyzed to determine at least one search criteria promotion, demotion, deletion, and/or addition for updating the search query in a goal of improving diversity in the search results. The match scoring computational operator defined at 120 may be redefined per the at least one query update determined and the procedure may be iterated through 130 to 160 for a plurality of iterations.

At 180, if the success criteria determined at 110 being met by the diversity measure calculated at 160 an output of one or more query updating suggestion(s) per the at least one determination made at 170 may be provided. The query updating suggestion(s) may be presented to a user via a user interface for acceptance and/or rejection. Additionally or alternatively, an output of top matching search results for the updated search query may be provided.

Figure 2:
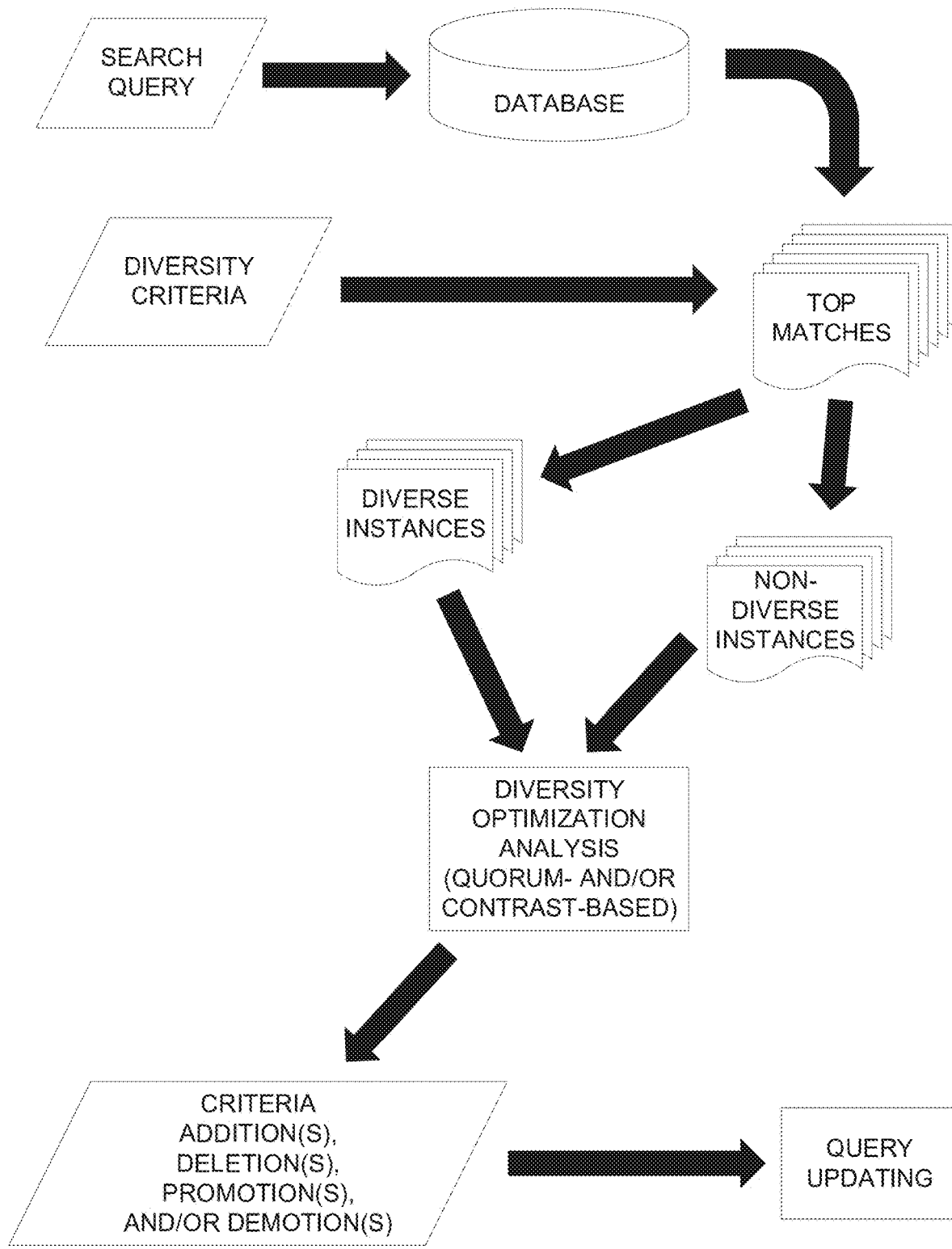
FIG. 2 is a schematic illustration of an optional flow of operations for database search enhancement, according to some embodiments.

Reference is now made to FIG. 2 which is a schematic illustration of an optional flow of operations for database search enhancement, according to some embodiments.

As shown in FIG. 2, search query to a database and a set of diversity criteria may be received as input, similarly as in 100 of FIG. 1. The search query may be executed on the database and a collection of top matches may be returned in result similarly as obtained through 120 to 150 of FIG. 1. The diversity criteria may be applied to the collection of top matches to extract therefrom at least one reference set for analysis to determine search query update(s) in optimization of diversity in search results.

In some embodiments, the at least one reference set may comprise a population of diverse instances among the top matches, i.e., instances meeting the diversity criteria, a population of non-diverse instances among the top matches, i.e., instances not meeting the diversity criteria, and/or the like. The at least one reference set, e.g., each of the populations of diverse instances and non-diverse instances and/or both, may be analyzed using quorum-based optimization and/or contrasting population-based optimization analysis, such as described herein, and accordingly a set of criteria modifications, i.e., criteria addition(s), deletion(s), promotion(s), and/or demotion(s), may be determined for updating the search query.

Optionally, both quorum-based and contrasting population-based optimization analysis may be employed to determine the set of criteria modifications.

Responsive to determination of the set of criteria modifications, the search query may be updated accordingly.

Figure 3A:
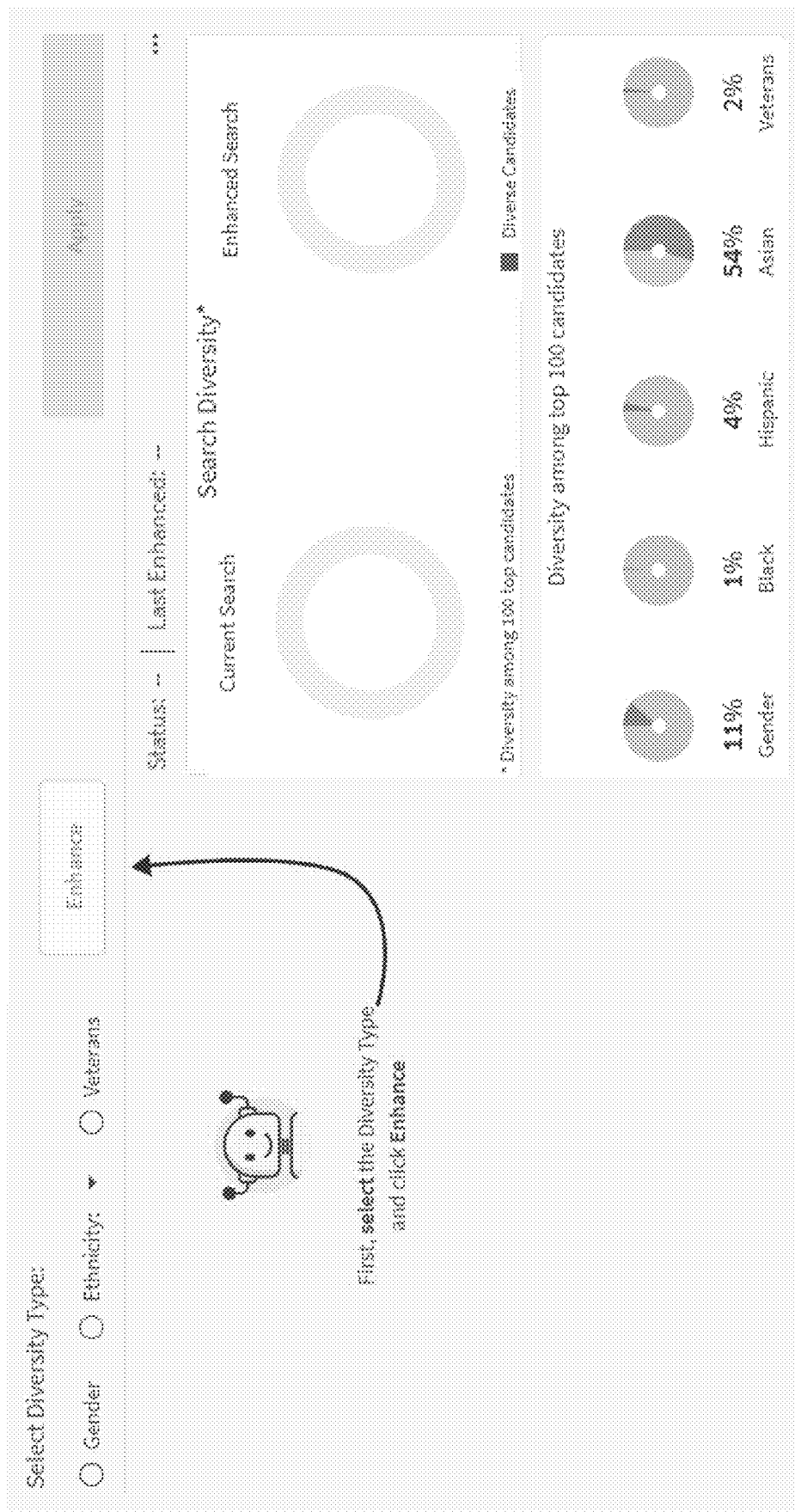
FIGS. 3A-3B are exemplary screen shots of a graphical user interface for enhanced database search, according to some embodiments.
Figure 3B:
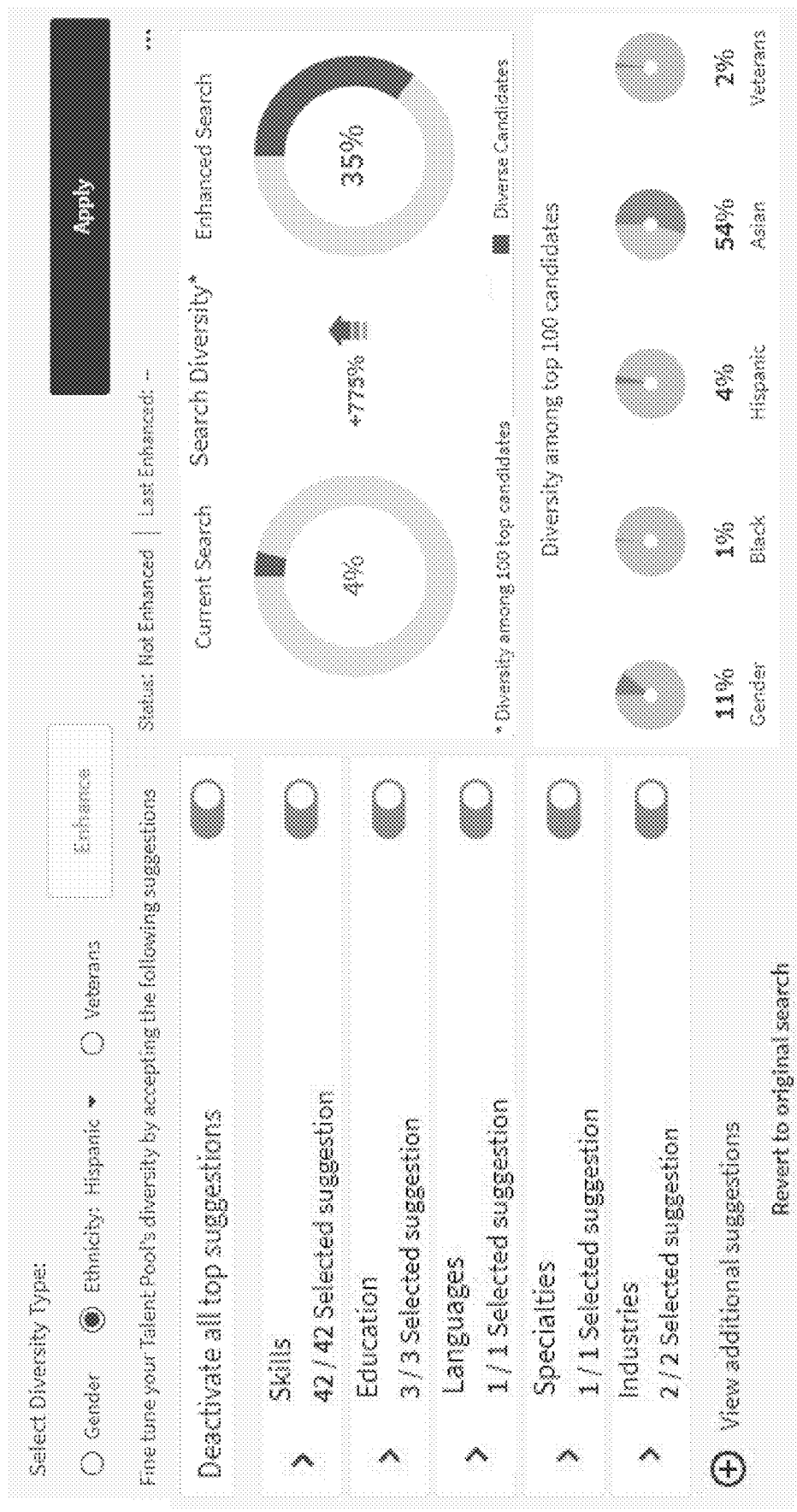

Reference is now made to FIGS. 3A-3B which are exemplary screen shots of a graphical user interface for enhanced database search, according to some embodiments.

As shown in FIG. 3A, responsive to a user submitting a search query to a database of prospective candidates (e.g., a talent profiles database and/or the like), the user may be prompted to select a diversity type which a distribution thereof among top matching results is to be affected, e.g., increased relative to initial results of the input query and/or otherwise enhanced. For example, as illustrated in FIGS. 3A-3B, the diversity type may be gender, ethnicity (specified by selection from a drop-down menu and/or the like, for example), veteran status, and/or any other likewise attribute of candidates in the database.

In some embodiments, the user interface may provide illustration of the share of diverse candidates, per the diversity type selected, among top matching candidates (e.g., top 100 as illustrated in FIGS. 3A-3B) prior to and following enhancement.

Optionally, the user interface may provide illustrations of respective shares of diverse candidates per different diversity types among top matching candidates prior to enhancements from any sort.

In some embodiments, a dashboard may be provided via the user interface, such as shown in FIG. 3B, which may allow the user to deactivate and/or reactivate suggestion(s) of search criteria modification(s) to the input search query. Optionally, the criteria modification suggestion(s) may be grouped by categories and a number of suggestion(s) selected by the user out of a total of suggestion(s) available at a category may be specified at the dashboard, such as illustrated in FIG. 3B.

In some embodiments, following selection of search criteria modification(s) per suggestion(s) for search enhancement provided, the user may update the search query with the selected modification(s), for example by using an "Apply" button as shown in FIGS. 3A-3B.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant database search enhancement tools and/or techniques will be developed and the scope of the term search enhancement is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for database search enhancement, comprising:

generating an interactive user interface configured for receiving a search query to a database comprising a plurality of records each assigned at least one class label and comprising a plurality of values grouped into a plurality of categories, the search query comprising a plurality of values and priority parameters thereof, grouped into the plurality of categories;

defining a scoring computational operator configured for calculating a match score of a record of the database using a plurality of criteria for determining a level of match between values of the record and values of the search query in the plurality of categories, and using the plurality of priority parameters for aggregating according thereto the level of match determined for each value of the search query by a respective one of the plurality of criteria;

for a collection of at least a subset of the plurality of records, over a plurality of iterations, performing:

calculating a match score for a record of the collection by applying thereon the scoring computational operator, ranking records of the collection based on the match score calculated for each, and selecting a sub-collection of top ranked records therefrom;

calculating a diversity measure for the sub-collection using the at least one class label of records therein;

responsive to the diversity measure not satisfying a sufficiency condition:

extracting from the sub-collection at least one reference set of records sharing in common one of the at least one class label assigned thereto;

determining, based on analysis of the at least one reference set, at least one modification to the search query in improvement of the diversity measure;

presenting the at least one modification to a user via the interactive user interface, wherein the interactive user interface being further configured to receive from the user an input indicating an approval or rejection of a respective one of the at least one modification; and in response to receiving an input indicating an approval of one or more of the at least one modification, redefining the scoring computational operator in accordance with the one or more of the at least one modification, whereby causing selection of a different sub-collection in a subsequent iteration;

and, responsive to the diversity measure satisfying the sufficiency condition, outputting the sub-collection.

2. The method of claim 1, wherein the at least one reference set comprising a class members set of records which the shared class label thereof indicates membership in a class of interest.

3. The method of claim 2, wherein the analysis comprising calculating for a criterion of the plurality of criteria a measure of consensus among records of the class members set respective of the criterion, and wherein determining the at least one modification comprising determining, based on the measure of consensus, at least one of: an increase of a priority parameter of a respective value of the criterion; a decrease of the priority parameter of the respective value of the criterion; and a removal of the respective value of the criterion from the search query.

4. The method of claim 2, wherein the analysis comprising:

selecting, from a record of the class members set, a value in one of the plurality of categories for which no respective criterion being comprised in the plurality of criteria;

defining a criterion for determining a level of match between values of a record of the database and the value in the respective one of the plurality of categories; and, calculating for the criterion a measure of consensus among records of the class members set of records respective of the criterion;

and wherein determining the at least one modification comprising determining, based on the measure of consensus, whether to add to the search query the value in the respective one of the plurality of categories.

5. The method of claim 2, wherein the at least one reference set further comprising a class non-members set of records indicated by the shared class label thereof as non-members of the class of interest.

6. The method of claim 5, wherein the analysis comprising: calculating for a criterion of the plurality of criteria a first measure of consensus among records of the class members set respective of the criterion, a second measure of consensus among records of the class non-members set respective of the criterion, and a ratio between the first and second measure; and wherein determining the at least one modification comprising determining, based on the ratio, at least one of: an increase of a priority parameter of a respective value of the criterion; a decrease of the priority parameter of the respective value of the criterion; and a removal of the respective value of the criterion from the search query.

7. The method of claim 5, wherein the analysis comprising: selecting from a record of the class members set of records a value in one of the plurality of categories for which no respective criterion being comprised in the plurality of criteria; defining a criterion respective of the value for determining a level of match between values of a record of the database and the value in the respective one of the plurality of categories; and calculating for the criterion a first measure of consensus among records of the class members set respective of the criterion, a second measure of consensus among records of the class non-members set respective of the criterion, and a ratio between the first and second measure; and wherein determining the at least one modification comprising determining, based on the ratio, whether to add to the search query the value in the respective one of the plurality of categories.

8. The method of claim 1, further comprising: setting the sufficiency condition using a baseline diversity measure calculated for a baseline collection of records of the database retrieved using a baseline query derived by selecting a subset of the plurality of values from the search query using at least one default category of the plurality of categories.

9. The method of claim 1, wherein the diversity measure is a measure calculated respective of member records sharing in common a class label indicating membership in a class of interest, the measure being selected from the group consisting of: a percentage of member records from a total of records in the collection; an aggregation of gains in density per bin of member records, wherein a total of records in the collection being divided into a plurality of bins according to the respective match score calculated for each; and an increase in an aggregate over member records of the respective match score calculated for each.

10. The method of claim 1, further comprising: prior to selecting the sub-collection, reranking records of the collection by grouping records of a same respective match score together and giving precedence within a same group to member records which the class label shared in common thereof indicates membership in a class of interest.

11. The method of claim 1, further comprising determining a subset of the plurality of categories in optimization of the diversity measure, wherein the search query being modified to exclude therefrom respective values in a category of the subset.

12. A method of providing an interactive user interface for database search enhancement, comprising:

generating an interactive user interface configured for receiving a search query to a database comprising a plurality of records each assigned at least one class label and comprising a plurality of values grouped into a plurality of categories, the search query comprising a plurality of values and priority parameters thereof, grouped into the plurality of categories;

defining a scoring computational operator configured for calculating a match score of a record of the database using a plurality of criteria for determining a level of match between values of the record and values of the search query in the plurality of categories, and using the plurality of priority parameters for aggregating according thereto the level of match determined for each value of the search query by a respective one of the plurality of criteria;

for a collection of at least a subset of the plurality of records, over a plurality of iterations, performing:
  calculating a match score for a record of the collection by applying thereon the scoring computational operator, ranking records of the collection based on the match score calculated for each, and selecting a sub-collection of top ranked records therefrom;
  calculating a diversity measure for the sub-collection using the at least one class label of records therein;
  responsive to the diversity measure not satisfying a sufficiency condition:
    extracting from the sub-collection at least one reference set of records sharing in common one of the at least one class label assigned thereto;
    determining, based on analysis of the at least one reference set, at least one modification to the search query in improvement of the diversity measure;
    adding the at least one modification to a set of recommendations for modifying the search query;
    presenting the at least one modification to a user via the interactive user interface, wherein the interactive user interface being further configured to receive from the user an input indicating an approval or rejection of a respective one of the at least one modification; and
    in response to receiving an input indicating an approval of one or more of the at least one modification, redefining the scoring computational operator in accordance with the one or more of the at least one modification, whereby causing selection of a different sub-collection in a subsequent iteration;

wherein responsive to the class diversity measure satisfying the sufficiency condition, presenting the set of recommendations via the interactive user interface indicating whether an approval or rejection of a respective member of the set of recommendations being indicated in an input received, the interactive user interface being further configured to receive an additional input in update of the approval or rejection of the respective member;

modifying the search query using modifications in the set of recommendations indicated in accordance with a most recent input as approved by the user, whereby obtaining a modified search query; and outputting at least a subset of records of the database retrieved by executing the modified search query.

13. A computer program product comprising:
a non-transitory computer readable storage medium; program instructions for executing, by a processor, the method of claim 1.

14. The computer program product of claim 13, wherein the at least one reference set comprising a class members set of records which the shared class label thereof indicates membership in a class of interest, wherein the analysis comprising calculating for a criterion of the plurality of criteria a measure of consensus among records of the class members set respective of the criterion, and wherein determining the at least one modification comprising determining, based on the measure of consensus, at least one of: an increase of a priority parameter of a respective value of the criterion; a decrease of the priority parameter of the respective value of the criterion; and a removal of the respective value of the criterion from the search query.

15. The computer program product of claim 13, wherein the at least one reference set comprising a class members set of records which the shared class label thereof indicates membership in a class of interest, wherein the analysis comprising:
  selecting, from a record of the class members set, a value in one of the plurality of categories for which no respective criterion being comprised in the plurality of criteria;
  defining a criterion for determining a level of match between values of a record of the database and the value in the respective one of the plurality of categories; and,
  calculating for the criterion a measure of consensus among records of the class members set of records respective of the criterion;
and wherein determining the at least one modification comprising determining, based on the measure of consensus, whether to add to the search query the value in the respective one of the plurality of categories.

16. The computer program product of claim 13, wherein the at least one reference set comprising: a class members set of records indicated by the at least one class label as members of a class of interest, and a class non-members set of records indicated by the at least one class label as non-members of the class of interest; wherein the analysis comprising: calculating for a criterion of the plurality of criteria a first measure of consensus among records of the class members set respective of the criterion, a second measure of consensus among records of the class non-members set respective of the criterion, and a ratio between the first and second measure; and wherein determining the at least one modification comprising determining, based on the ratio, at least one of: an increase of a priority parameter of a respective value of the criterion; a decrease of the priority parameter of the respective value of the criterion; and a removal of the respective value of the criterion from the search query.

17. The computer program product of claim 13, wherein the at least one reference set comprising: a class members set of records indicated by the at least one class label as members of a class of interest, and a class non-members set of records indicated by the at least one class label as non-members of the class of interest; wherein the analysis comprising: selecting from a record of the class members set of records a value in one of the plurality of categories for which no respective criterion being comprised in the plurality of criteria; defining a criterion respective of the value for determining a level of match between values of a record of the database and the value in the respective one of the plurality of categories; and calculating for the criterion a first measure of consensus among records of the class members set respective of the criterion, a second measure of consensus among records of the class non-members set respective of the criterion, and a ratio between the first and second measure; and wherein determining the at least one modification comprising determining, based on the ratio, whether to add to the search query the value in the respective one of the plurality of categories.

18. A computer program product comprising:
a non-transitory computer readable storage medium;
program instructions for executing, by a processor, the method of claim 12.

19. A system for database search enhancement, comprising:
a processing circuitry adapted to execute a code for performing the method of claim 1.

20. A system providing an interactive user interface for database search enhancement, comprising:
a processing circuitry adapted to execute a code for performing the method of claim 12.

* * * * *